UNITED STATES PATENT OFFICE.

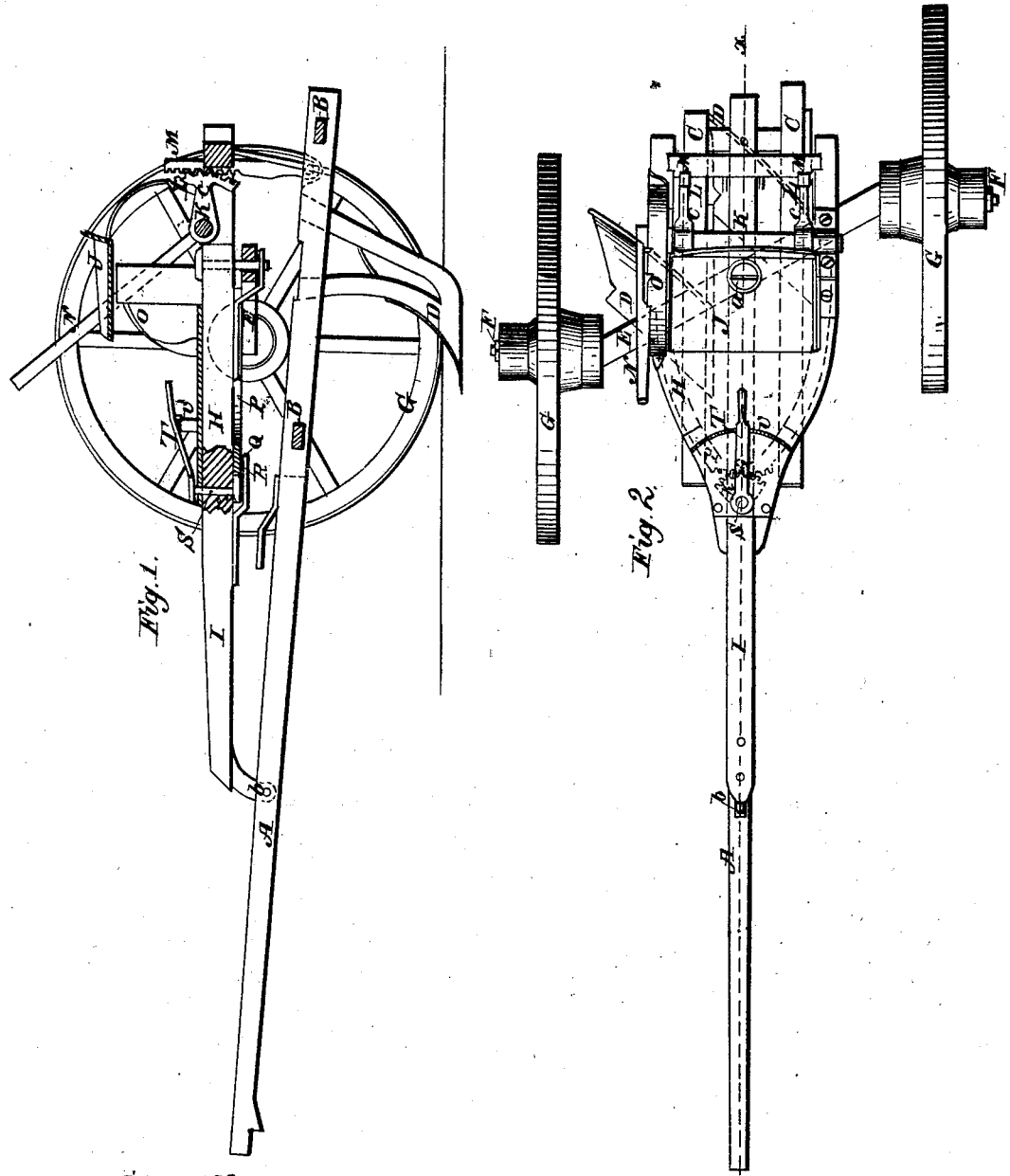

HENRY WEBSTER, OF BEETOWN, WISCONSIN.

GANG-PLOW.

Specification forming part of Letters Patent No. 46,164, dated January 31, 1865.

*To all whom it may concern:*

Be it known that I, HENRY WEBSTER, of Beetown, in the county of Grant and State of Wisconsin, have invented a new and Improved Gang-Plow; and I do hereby declare that the following is a full, clear, and exact description thereof, which will enable those skilled in the art to make and use the same, reference being had to the accompanying drawings, making a part of this specification, in which—

Figure 1 is a side sectional view of my invention, taken in line $xx$, Fig. 2; Fig. 2, a plan or top view of the same.

Similar letters of reference indicate like parts.

This invention relates to a new and improved gang-plow for turning two or more furrows simultaneously; and it consists in a means for readily guiding the plows so as to give the same more or less land, and also in a means for raising and lowering the plows to regulate the depth of their penetration in the earth, and to elevate them above the surface of the same when they are not required for use.

A represents a draft-pole, to the back part of which there are attached by cross-bars B B two parallel beams, C C, each of which has a plow, D, secured to it, the plow of one beam being slightly in advance of that of the other.

E is an axle, which is attached by a central pivot, $a$, to the back part of the draft-pole A. This axle has an oblique position relatively with the draft-pole A, and the ends of the axle are provided with arms F, which have an oblique position with the axle, but are parallel with each other. The wheels G of the axle E, are of ordinary construction.

H is a frame, which is directly on the back part of the draft-pole A and beams C C, and has a projecting arm, I, which extends along over the draft-pole, and is connected to it by a joint, $b$. On this frame H the driver's seat J is secured, and in said frame there is placed a transverse shaft, K, having two arms, $c\ c$, keyed upon it, the outer ends of which are provided with toothed segments L L, the latter gearing into vertical racks M M, attached, one to each beam C.

To one end of the shaft K there is attached a lever, N, which engages with a toothed rack, O, at one side of the frame H, and by adjusting this lever N the plows D may be raised and lowered and secured at any desired point by fitting the lever N in the proper notch in the rack O.

The axle E has a bail-shaped projecting bar, P, at its front side, the front end of P being provided with a toothed segment, Q, into which a segment, R, gears, the latter being on a vertical shaft, S, which passes through the frame H and has a lever, T, on its upper end. By actuating this lever T the axle E may be turned on its pivot $a$, and the wheels G so turned as to give the plows D more or less land, as may be required. The axle E is secured in the desired position by fitting the lever T in one of a series of notches in a curved bar, U.

Thus by this simple arrangement the plows are placed wholly under the control of the driver or attendant, both as regards their vertical adjustment to regulate the depth of the furrows and their lateral adjustment for giving them more or less land.

Having thus described my invention, what I claim as new, and desire to secure by Letters Patent, is—

1. The employment or use in a mounted gang-plow of an oblique adjustable axle so arranged as to admit of the ready adjustment of the wheels for giving the plows more or less land, substantially as set forth.

2. The frame H, applied to or connected with the draft-pole A by means of a joint, in connection with the racks and toothed segments, when applied to a gang-plow, substantially as set forth.

HENRY WEBSTER.

Witnesses:
WILLIAM HAMMOND,
GEO. H. POND.